Dec. 3, 1946. J. R. OSUNA Re 22,814

APPARATUS FOR CONTINUOUS CLARIFICATION

Original Filed July 10, 1941 3 Sheets-Sheet 1

INVENTOR.
Jose Ramon Osuna
By
Singer, Ellert, Stern & Carlberg
ATTORNEYS

Dec. 3, 1946. J. R. OSUNA Re 22,814

APPARATUS FOR CONTINUOUS CLARIFICATION

Original Filed July 10, 1941 3 Sheets-Sheet 2

INVENTOR.
Jose Ramon Osuna
BY
Singer, Ehlert, Stern & Carlberg
ATTORNEYS

Dec. 3, 1946. J. R. OSUNA Re 22,814

APPARATUS FOR CONTINUOUS CLARIFICATION

Original Filed July 10, 1941 3 Sheets-Sheet 3

INVENTOR.
Jose Ramon Osuna
BY
Singer, Ehlert, Stern & Karlberg
ATTORNEYS

Reissued Dec. 3, 1946 Re. 22,814

UNITED STATES PATENT OFFICE 22,814

APPARATUS FOR CONTINUOUS CLARIFICATION

José Ramón Osuna, Marianao, Cuba

Original No. 2,307,154, dated January 5, 1943, Serial No. 401,824, July 10, 1941. Application for reissue December 3, 1943, Serial No. 512,761. In Cuba July 30, 1940

7 Claims. (Cl. 127—13)

The method heretofore employed in the manufacture of sugar and particularly in the sugar refining operation, consists in subjecting the syrups formed by dissolution of washed or affinated raw sugar to a purification process which is carried out as follows: The washed or affinated sugar is dissolved in water in tanks provided with agitators to form a syrup with a density of 60° Brix, and the syrup obtained is purified by treatment with chemical agents and heat. The solutions thus treated are discharged into open tanks (defecators) to be subjected to clarification by decantation. The number of defecators or tanks is dependent upon the amount of material to be treated in 24 hours and upon the time required for obtaining the clarification in each tank. In the case of dense solutions which are the ones being usually treated at sugar refineries, the average time required for decantation varies from 45 to 60 minutes and sometimes more, depending upon the liquid level, density and temperature.

The processes heretofore employed require the temperature to be raised sometimes even to above 216° F. in order that the floccules formed may rapidly ascend to the liquid surface and properly separate after they have overcome the weight of the liquid upon them. It is just in this stage that the so-called "manufacturing losses" occur, which are caused by the heat affecting the sucrose and tending to invert it thereby yielding a greater percentage of molasses to the factory; heat also causing the liquid to become darkened on account of the candied condition of sucrose, and the use of additional decoloring agents being required in a further decoloring operation in order to obtain a No. 1 liquor from which refined sugar is obtained as the final product.

This invention has for its object to provide a method of and apparatus for subjecting the non-crystallized sugar syrups, solutions or juices to a continuous clarification at a rate of vacuum between 29" and 0", a temperature difference of 3° C. or more below the corresponding vacuum temperature, being used. Said 3° C. temperature difference is used for the purpose of preventing the liquid from boiling for it is a well known fact that every liquid attains a boiling point according to the pressure acting upon same.

The advantages possessed by my clarification method and apparatus are, in the case of refinery syrups, that these can be clarified at a lower temperature than is at present required, without danger of increasing the darkness of color, and an increase of velocity is attained which permits to treat a larger quantity of material in the same period of time with smaller tanks and in a shorter period of treatment, whereupon a considerable reduction is obtained in the losses on inversion which occur under the methods at present known.

The invention is described with reference to the figures of the accompanying drawings, of which:

The method of clarification being an object of this invention consists in clarifying liquids at a pressure below the atmospherical pressure within sealed tanks having compartments within which the liquid flows upwardly, impurities deposited above the liquid level being eliminated and the partial withdrawal of clarified liquid being effected at the lowest zone of each compartment, in contrast to the clarification methods at present known in which the liquid flows downwardly, the mud is withdrawn at the bottom and the partial removal of clarified liquid is effected at the upper zone of each compartment.

Figure 1:
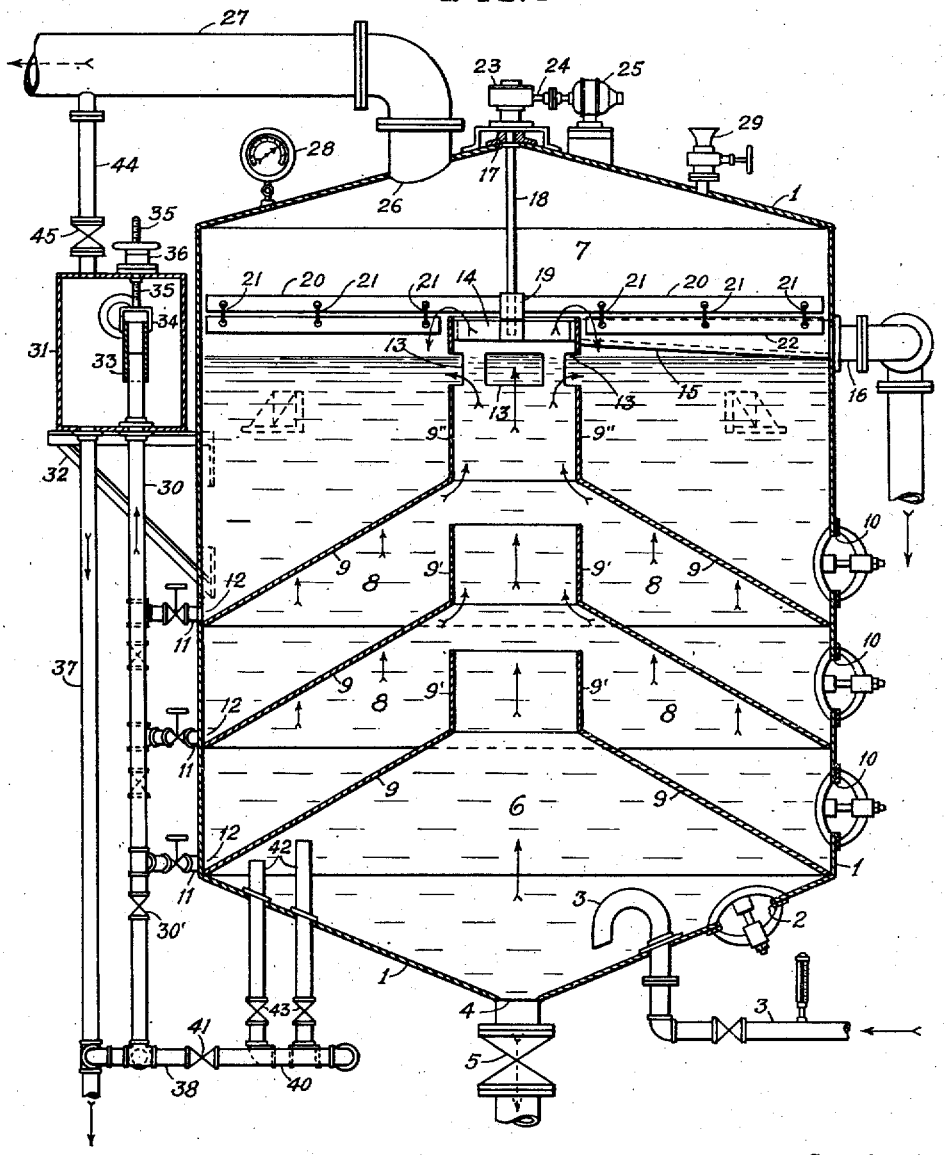
Fig. 1 is a diametral vertical sectional view of a continuous clarifier and attachments thereof for carrying out the clarification method being the subject-matter of this invention.
Figure 2:
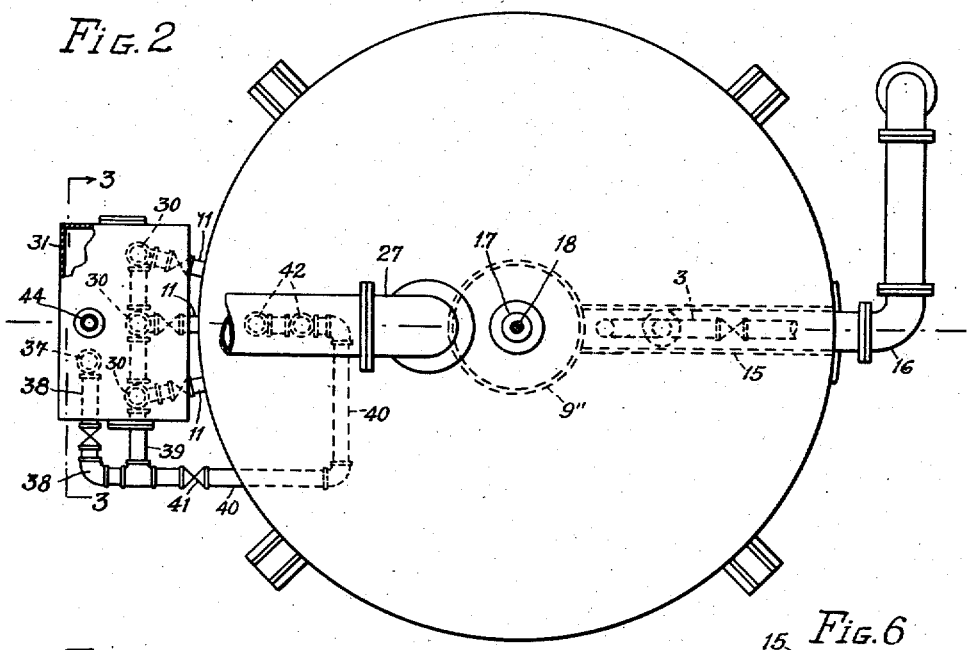
Fig. 2 is a top plan view of same.
Figure 5:
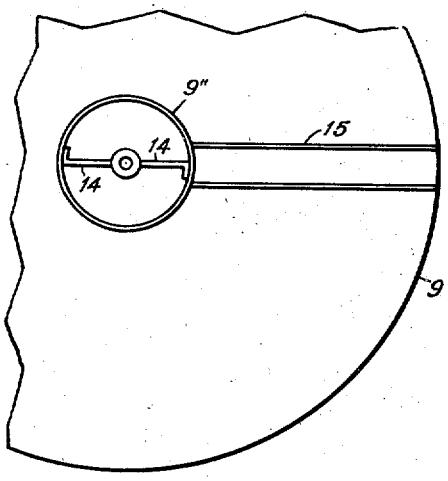
Fig. 5 is a fragmentary top plan view of the same tray.
Figure 6:
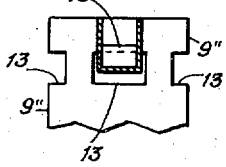
Fig. 6 is a vertical cross-section view on line 6—6 of Fig. 4.
Figure 4:
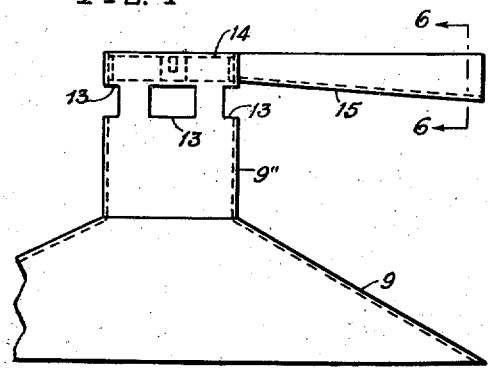
Fig. 4 is a fragmentary outer elevational view of the tray forming the upper chamber of the clarifier.
Figure 8:
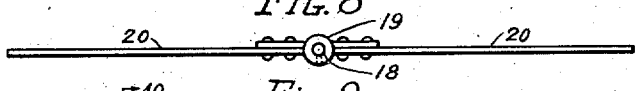
Fig. 8 is a detailed edge view of an arm agitator used for the liquid surface with the clarifier.
Figure 9:
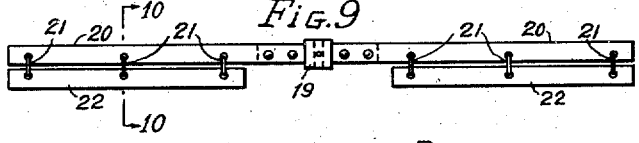
Fig. 9 is an elevational detailed view of the same arm agitator.
Figure 3:
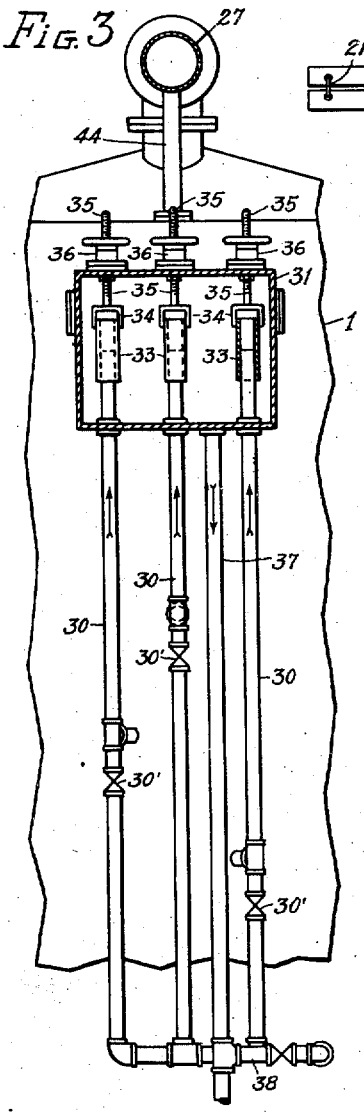
Fig. 3 is a longitudinal vertical sectional view of the level regulator on line 3—3 of Fig. 2.
Figure 10:
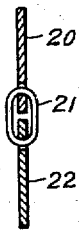
Fig. 10 is a vertical cross-section detailed view on line 10—10 of Fig. 9.
Figure 7:
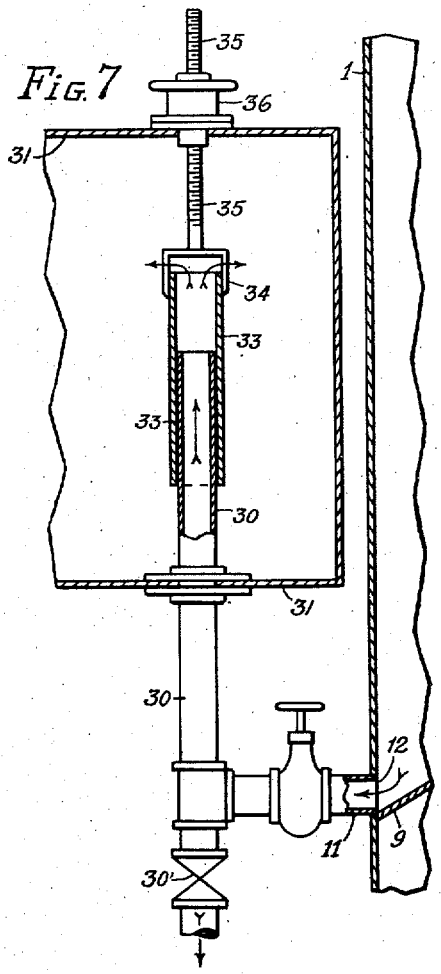
Fig. 7 is a detailed view showing in a broken longitudinal vertical section the level regulator annexed to the continuous clarifier and the latter's connection with the former.

In the drawings is illustrated a clarifier device for carrying out the method of this invention, and possibly others, which device consists of a cylindrical tank 1 closed at the top, the upper portion of which is conical in shape and its bottom portion is in the shape of an inverted cone. The bottom of tank 1 is provided with a register opening 2 having a pressure cover and a feed-tube 3 for the liquid to be clarified, said feed-tube 3 ending in the form of an inverted syphon at a predetermined height from the bottom, and the bottom of the tank 1 has also a central opening and therein a discharge tube 4 provided with a controlling valve 5. The tank is divided interiorly into a lower flocculation chamber 6, an upper sludge discharge chamber 7 and an intermediate series of clarifying chambers 8, by means of a plurality of annular baffles or trays 9 of frusto-conical shape or sloping from the center to the periphery. Said trays are secured at their outer edge to the peripherial wall of tank 1 and each has an upstanding cylindrical portion 9′ at their upper open portion to permit the liquid to pass upwards along the central line of tank 1. Each compartment 8 is provided at the peripherial wall of tank 1 with a register opening 10 for cleaning purposes at one side thereof and at the other side each compartment has a small opening and a discharge tube 11 provided with a controlling valve 12 for the liquid clarified in the lowest zone of each compartment. The tray 9 serving as a bottom portion for the sludge upper discharge chamber 7 has a vertical cylindrical portion 9″ which is higher than the vertical cylindrical portions 9′ of the lower trays and is provided with four openings 13 near its upper portion which is crossed by a diametral partition 14 dividing the cylindrical portion in two half portions laterally opened in a bottom inclined radial conduit 15 (Fig. 4) terminating at the peripherial wall of tank 1 in an opening provided with a discharge tube 16 for the sludge separated from the liquid surface. At the upper central portion of the tank 1 is rotatably mounted on a bearing 17 a vertical shaft 18 supported at its lower end on a bearing 19 integral at the middle portion of partition 14. The vertical shaft 18 is provided at its lower end with agitator arms formed by vertical blades 20 in diametral alignment from which other vertical parallel blades 22 are hanging through rings 21, the vertical shaft 18 being rotated at a very slow speed by means of a horizontal helicoidal wheel 23 actuated by a worm gear 24 coupled to the shaft of an electric motor 25 supported on the upper portion of tank 1. The upper portion of tank 1 has a large opening 26 for connection with the suction pipe 27 communicating with a vacuum condenser which is not shown, for maintaining sub-atmospheric pressure on the surface of the liquid in the tank and at said upper portion of tank 1 there are also disposed a vacuum manometer 28 and a tube with a controlling valve 29 for communicating the interior of tank 1 with the atmosphere, when desired.

The tubes 11 for discharging the clarified liquid in the lowest zone of the intermediate compartments 8 and the upper chamber 7 are connected to vertical tubes, conduits, or pipes 30 the number of which is equal to that of tubes 11, three of said tubes being indicated in the drawings. Said tubes 30, each hold a column of liquid normally in hydraulic communication with the body of liquid being treated in the tank 1, rise up to a predetermined height above the bottom portion of a control chamber or closed box 31 supported on a bracket 32 secured exteriorly to the peripherial wall of tank 1, and each tube 30 is provided with a controlling valve 30′. On the upper, portions of the three tubes 30 are slidably mounted cylindrical sleeves 33 which fit on tubes 30 and form at their upper ends discharge openings the height of which is adjusted by means of clamps 34 secured to the sleeves 33 and connected to vertical screws 35 threadedly mounted in nuts 36 rotatably mounted on the upper portion of box 31, the object of said three vertically slidable discharge sleeves 33 being to control the discharge height of the liquid falling from tubes into an overflow liquid receiving space outside of the main wall of the tank 1, such as is provided by box 31 and therefore the level of the liquid within the upper chamber 7 of tank 1. The box 31 is provided with a clarified liquid discharge tube 37 leaving from the bottom of the box and leading downwards to end in a collector tank (not shown) disposed far beneath the tank 1, said collector tank being completely sealed to maintain the required vacuum in the system. The tube 37 has a horizontal branch tube 38 connected to the three vertical tubes 30 by means of the horizontal tube 39 and said tube 38 in turn extends to form a branch tube bent twice at an angle as indicated by 40 and has a controlling valve 41 beneath the bottom of tank 1. Through the bottom of tank 1 two tubes 42 each having a controlling valve 43 extend upwards to be connected at the end of the branch tube 40 and terminate at their upper open end near the tray 9 which serves as a cover for the flocculation chamber 6, the function of said tubes being to serve as outlets for the clarified liquid when the clarifier is emptied for cleaning purposes. The level controlling box 31 is in communication with the vacuum or suction pipe 27 through a suction tube 44 having a controlling valve 45 and leading from the upper portion of the box 31.

The method of continuous vacuum clarification is carried out by means of the described apparatus, as follows: The liquid to be clarified enters through feed-tube 3 into the bottom portion of tank 1 and arises in flocculation chamber 6. The first floccules carried along by the liquid to the upper edge of the upstanding cylindrical portion 9′ of the lower tray 9 separate from the liquid. Said cylindrical portion 9′ and lower tray 9 discharge the liquid and the floccules into the lower intermediate compartment 8 wherein additional floccules separate. The liquid and the separated floccules pass into the upper intermediate compartment 8 and from the latter into the upper chamber 7 wherein the liquid level is regulated by previous adjustment of cylindrical sleeves 33 of tubes 30 through suitable action by the screws 35. Agitator arms 20—22 are rotated on the surface of the liquid in chamber 7, which sweep the floccules separated in the various compartments and deposited on the surface of the liquid within upper chamber 7 and lead them toward the bottom inclined radial conduit 15 which carries them to discharge tube 16 through which the sludge separated from the liquid within tank 1 is withdrawn. The clarified liquid occupying the lowest zone of each compartment 8 and upper chamber 7 by reason of the floccules tending to arise on account of their buoyed up condition, is withdrawn through tubes 11 and discharged through vertical tubes 30 within the box 31 and finally collected through vertical tube 37 in the aforesaid collector tank (not shown).

The tank 1, box 31 and clarified liquid collector tank being sealed, the system operates at a pressure below atmospherical pressure, preferably at a pressure of 35 mms., and a difference of 3° C. in temperature is used below the temperature corresponding to the vacuum pressure in the apparatus in order to avoid treatment of the liquid at a temperature sometimes above 216° F. at which the continuous clarification operation must be performed under the processes and apparatus at present used. My vacuum process and apparatus eliminate the losses of sucrose on inversion which at present occur as caused by heat and the increase of darkness of color of syrups due to the candied condition attained by sucrose, thereby causing the use of a larger amount of decoloring agents in the decoloring operation in order to obtain the so-called No. 1 liquor and the production of a greater percentage of molasses in the crystallization operation in which refined sugar is obtained.

It is obvious that the operating details of the method, the character of the liquid suspension treated, and the construction details of the apparatus for carrying it out can be varied within certain limits without thereby affecting the essential character of the invention within the scope of the appended claims.

What I claim is:

1. An apparatus for continuous clarification, comprising a cylindrical tank divided by means of trays of frustro-conical shape sloping from the middle portion to the periphery in an upper chamber for sludge separation, a lower liquid entering and initial flocculation chamber, and a plurality of intermediate compartments for additional clarification upwards, a feed tube for the liquid to be clarified in the lower chamber, said trays having a large opening at the center of their upper portion from the edge of which rises a cylindrical tube, a sludge discharge tube above the liquid level in the upper chamber means for maintaining reduced pressure in the tank, and tubes for withdrawal of clarified liquid at a point of the lowest zone of each compartment.

2. An apparatus for continuous clarification, comprising a cylindrical tank divided by means of circular trays of frustro-conical shape sloping from the middle portion to the periphery in an upper sludge separation chamber, a lower chamber for liquid entrance and initial flocculation and intermediate compartments for additional clarification upwards, a feed tube for the liquid to be clarified in the lower chamber, said trays having a large opening at the center of their upper portion from the edge of which rises a cylindrical tube, agitator arms rotatably mounted on a vertical shaft in the upper chamber at a level adjacent the liquid surface, means for maintaining reduced pressure in the tank, a radial conduit having an inclined bottom portion situated beneath the agitator arms to receive the sludge gathered on the liquid surface, a sludge discharge tube connected to the tank wall at the end of the radial conduit, and tubes for withdrawing clarified liquid at a point of the lowest zone of each compartment.

3. An apparatus for continuous clarification, comprising a cylindrical tank divided by means of circular trays of frusto-conical shape sloping from the middle portion to the periphery in an upper sludge separation chamber, a lower chamber for liquid entrance and initial flocculation and intermediate compartments for additional clarification upwards, said trays having a large opening at the center of their upper portion from the edges of which rises a cylindrical portion which does not reach the immediate upper tray, a feed tube for the liquid to be clarified in the lower chamber, which tube ends in the shape of an inverted syphon at a predetermined height above the tank bottom, agitator arms rotatably mounted on a vertical shaft in the upper chamber at a level adjacent the liquid surface, a radial conduit having an inclined bottom portion situated beneath the agitator arms to receive the sludge gathered on the liquid surface, a sludge discharge tube connected to the tank wall at the end of the radial conduit, tubes for withdrawal of clarified liquid at a point of the lowest zone of each intermediate compartment and upper chamber, means for maintaining reduced pressure in the tank and outer means for regulating the surface level of the liquid within the tank, said means consisting of a box enclosing the upper portions of the clarified liquid withdrawal tubes and cylindrical sleeves slidably adjusted on the discharge openings of the withdrawal tubes for regulating the discharge fall height within the box.

4. Apparatus for continuous operation on liquid suspensions, comprising a sealed casing arrangement for holding an ever-changing body of liquid being treated, annular baffle means having an inclined face separating such casing arrangement into liquid communicating compartments, means for applying suction to the interior of the casing for maintaining sub-atmospheric pressure on liquid therein, means for controlling the elevation of the liquid level in the casing, means for withdrawing floating material from such liquid level, means for conducting feed-liquid through the bottom section of the casing to the region of such level, and means including a conduit passing through the casing and leading from an elevation substantially below such level for withdrawing downwardly descending clarified liquid from at least one of the compartments through a liquid-conducting passage located functionally remote from such level and adjacent the bottom of that compartment.

5. Apparatus for continuous operation on liquid suspensions, comprising a sealed tank adapted to hold an ever-changing body of liquid being treated, means for applying suction to the interior of the tank for maintaining sub-atmospheric pressure on liquid therein, means for withdrawing floating material from the liquid level in the tank, means for conducting feed-liquid through the bottom section of the tank and risingly to the region of such level, substantially annular baffle means extending to an elevation below such level in the tank and so disposed as to encircle the conducted feed-liquid but with one side thereof facing such feed-liquid and with one side thereof facing away from such feed-liquid, and means for passing downwardly descended clarified liquid to discharge from the tank including conduit means passing through the tank as well as leading from an elevation below such level and from that side of the baffle means facing away from such feed-liquid.

6. Apparatus according to claim 5, with the addition of a chamber extending beyond the tank but subject to subatmospheric pressure for holding under such sub-pressure a column of clarified effluent liquid passed from the tank to the chamber, said conduit means leading from the tank to the chamber, and means for discharging liquid from the chamber to the atmosphere.

7. Apparatus according to claim 5, with the addition of a chamber extending beyond the tank but subject to such sub-atmospheric pressure for holding under such sub-pressure a column of upflowing clarified effluent liquid passed from the tank to the chamber, said conduit means leading from the tank to the chamber, means for discharging liquid from the chamber to the atmosphere, adjustable means associated with the chamber operative upon the effluent liquid delivered through said conduit means for controlling the liquid level therein, and means extending to a place of atmospheric pressure for adjusting the adjustable means.

JOSÉ RAMÓN OSUNA.